UNITED STATES PATENT OFFICE 2,082,521

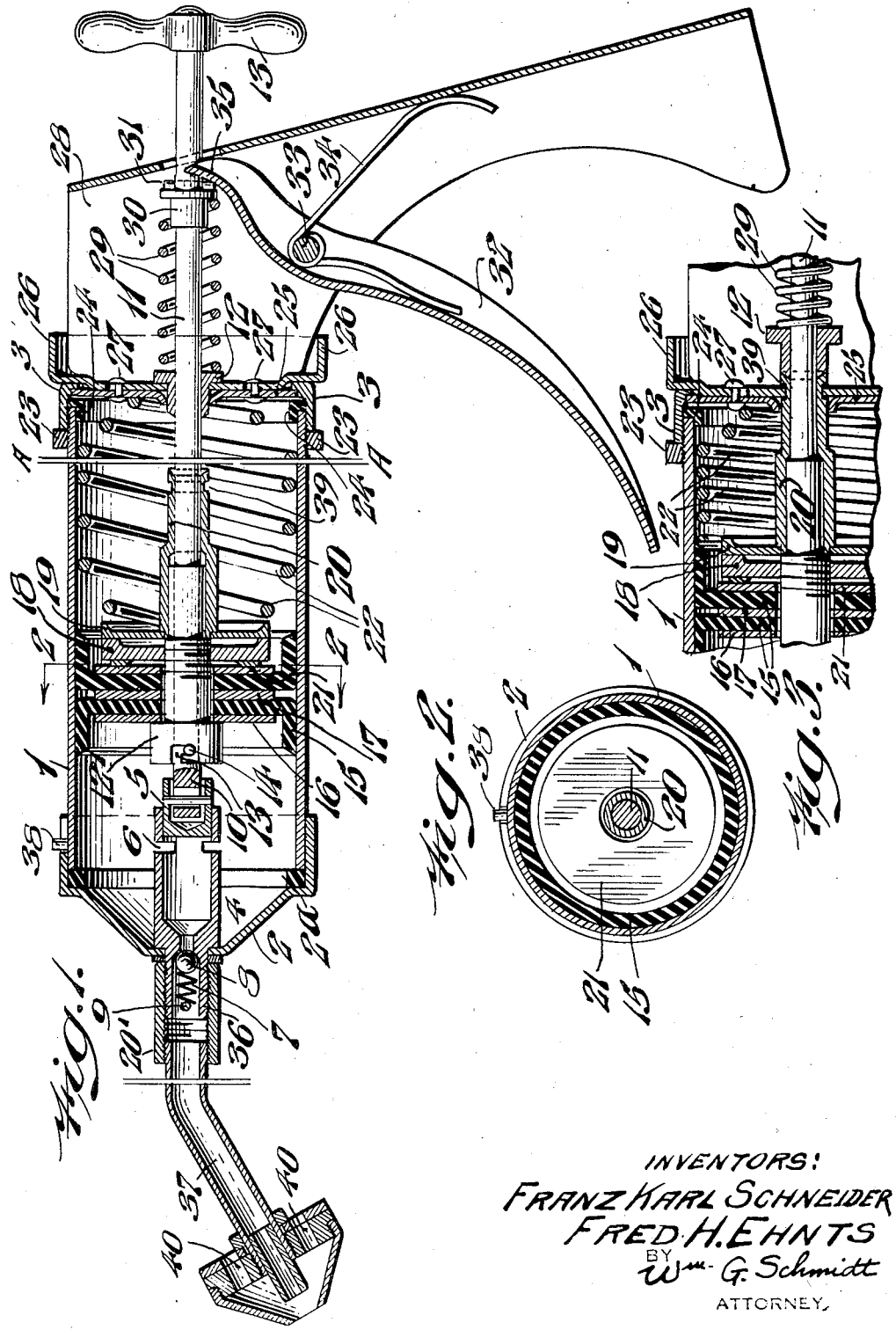

PRESSURE GREASE GUN

Franz Karl Schneider and Fred Henry Ehnts,
Philadelphia, Pa.

Application May 9, 1936, Serial No. 78,834

1 Claim. (Cl. 221—47.4)

Our invention relates to lubricating devices known as manually operated pressure grease guns which are adapted to the lubricating of bearings, fittings and other mechanical objects, particularly those requiring measured quantities of lubricant at desirable pressures.

The conventional grease gun consists of a cylinder which contains a supply of grease or lubricant and a discharge nozzle from which the grease is ejected by a mechanism in the cylinder. To fill the conventional type of grease gun with lubricating material, means have been devised for not only retracting the piston against the action of a spring, but for locking the compressed spring at the rear of the cylinder in order to facilitate the drawing into the cylinder of the grease supply by the liberated piston.

Our present invention not only incorporates all of the desirable features of the prior art, but because of certain novel improvements is adapted to achieve a number of more useful objectives. One of the objects of our invention is to enable the operator to fill the low pressure cylinder of the gun with grease when the compression spring is locked and to discharge it through an auxiliary high pressure cylinder by means of a trigger-actuated piston rod that is common to both cylinders.

Another object of our invention is to eject the grease or lubricant through a nozzle for the purpose of filling a bearing or a fitting with a required quantity of grease at a predetermined pressure.

Other purposes and further advantages will be more fully disclosed in a description of the accompanying drawing, in which:

Figure 1 is a longitudinal sectional view of the gun and nozzle severed at A—A.

Figure 2 is a sectional view taken on line 2—2 of Figure 1.

Figure 3 is a sectional view of part of the gun showing its compression spring locked.

Referring specifically to the drawing, in which like reference numerals indicate like parts, 1 indicates a barrel or cylinder closed at the forward end with a cap 2 and a washer 2a and at the rear end with a cap 3. At the forward end of the barrel 1 is the high pressure cylinder 4 in which the high pressure piston 5 travels in a reciprocating manner. The grease enters the high pressure cylinder 4 through the lateral opening 6 when the high pressure piston 5 is retracted. A check valve 8 is disposed in the orifice end of the cylinder 4 and is seated by means of a spring 7, held in position by a pin 9. The valve 8 opens to the discharge strokes of the high pressure piston 5 and closes to its retractive or cylinder filling strokes. A high pressure piston 5 is mounted on the forward end 10 of the piston rod 11 which runs the entire length of the barrel 1, passing through a guide bushing 12 and terminating in a pull handle 13. Near the forward end 10 of the piston rod 11 is a low pressure piston sleeve 12' containing a bayonet slot 13 which can be engaged or not with a bayonet pin 14. Mounted immediately behind the sleeve 12' on the piston rod 11 and free to move thereon are cup leathers 15, a front washer 16, a separator washer 17, a cup washer 18, a front spring retainer 19 and a spring compressor sleeve 20— constituting the important parts of a low pressure piston designated, collectively, as 21. A coiled compression spring 22 is disposed along the piston rod 11 between the piston 21 and the closure cap 3. The cap 3 is held fixedly in place by means of the lock ring 23. A thrust ring 24 fits tightly over the rear end of the barrel 1 and receives the pressure from, and allows for, the coupling plate 25 to which are attached a movable latch 26, through the medium of spaced rivets 27, and a stock 28, rotatable by virtue of its attachment by rivets to the coupling plate 25. Within the stock 28 are housed a piston rod spring 29 and a piston rod spring thimble 30. A trigger pin 31 penetrates the rod 11 parallel in alignment to the pull handle 13. A trigger 32, rotatable about a screw axis 33 against the action of a trigger spring 34, is mounted within the stock 28 and bears with its forked upper portion 35 against either the trigger pin 31 or the spring thimble 30, depending on the internal or external setting of the pin 31. At the forward end of the cylinder 4 is a threaded orifice 36 which can be joined to a rigid nozzle 37 by means of a coupling sleeve 20'. The nozzle 37 is described in detail in an allowed application, Serial Number 62,430, in which Fred H. Ehnts is set forth as the inventor and Franz Karl Schneider as an assignee of one-half interest. Nozzle 37 is designed as a back pressure indicating device and is to be used in conjunction with a metering gun such as described in the present application. The primary function of our grease gun and nozzle is to supply the required quantity of lubricant at a predetermined and desirable pressure to all kinds of bearings.

The following description of the use of the gun and nozzle, not only discloses the operation of the mechanism, but clearly defines the specific purposes and the inter-relationship of the several working parts. In order to fill the gun with grease the cap 2 with the attached nozzle 37 is removed from the barrel 1 by rotating, partly, its knurled surface until the oblique slots are disengaged from the pins 38 and pulling it and the nozzle from the barrel. The pull handle 13, rigidly attached to the piston rod 11, is then rotated until the trigger pin 31 is brought to a vertical position when it will freely pass through the forked end 35 of the trigger 32 and through the back of the stock 28. The piston rod 11 is then fully drawn back by pulling outwardly the pull handle 13. The low pressure piston 21 (comprising the parts 15, 16, 17, 18, 19 and the spring compressor 20) is carried by the piston rod toward the stock end of the gun, compressing the spring 22. When the spring 22 is fully compressed, the concave end of the spring compressor sleeve 20 engages with a counterpart surface in the guide bushing 12 and carries it back into the stock 28 (as shown in Figure 3) where the notch 39 at the end of the spring compressor 20 receives the latch 26 when it is depressed. Thus the spring 22 is held in a compressed position. The piston rod 11 is then gently drawn back and rotated clockwise until the operator feels that the pin 14 has slipped into the bayonet slot 13 in the piston sleeve 12' and has become locked therein. The piston rod 11 is then pushed forward as far as possible, carrying with it the low pressure piston 21 (comprising parts 15, 16, 17 and 18) since the sleeve 12' is locked to the piston rod 11. The open end of the barrel 1 is then immersed in a supply of grease and the piston 21 is slowly retracted by pulling on the handle 13. When the piston 21 has reached the end of its stroke and the barrel 1 is filled with grease, the piston rod 11 is rotated counter-clockwise and pressed forward in order to disengage the bayonet pin 14 from the piston sleeve 12'. The forward motion of the piston rod is continued with a slight twisting in order to bring the trigger pin 31 into a vertical position for the purpose of having it pass through the back of the stock 28 and through the forked end 35 of the trigger 32. After the trigger pin 31 has reached a position in front of the fork 35, the piston rod 11 is rotated through one-fourth of a turn in order to place the pin 31 transversely with respect to the fork 35. With the high pressure piston 5 in its proper forward position and prepared to enter the high pressure cylinder 4, the cap 2 with the attached nozzle is replaced and the latch 26 is pressed upwardly, causing the spring compressor 20 to become disengaged and the spring 22 to expand and to force the low pressure piston 21 forwardly. Partly through the pressure exerted by the spring 22 on the grease, and partly through the vacuum created by the reciprocating motion of the high pressure piston 5 in the high pressure cylinder 4, the grease will pass through the ports 6 into the cylinder 4 to be ejected by the forward motion of the piston 5 past the check valve 8, through the nozzle 37, and into a bearing requiring lubrication. With every release of the trigger 32 the high pressure piston 5 ejects approximately .07 oz. of grease. When the bearing has been fully and properly lubricated the excess grease extrudes through the openings 40 of the back pressure indicating nozzle 37. Although the gun, as described, is primarily to be employed as a metering or measuring ejector of lubricant or grease, yet it is possible, by locking the spring 22, to use the mechanism as a squirt or pressure gun.

While the construction, as shown and described, is the preferred embodiment of our device, nevertheless the same may be modified in detail without departing from the spirit and the scope of the invention as defined in the annexed claim.

Having thus described our invention, we claim as new and desire to secure by Letters Patent:

A grease gun, comprising a low pressure cylinder adapted to contain grease, having a back pressure indicating nozzle and closure cap at one end and a closure cap and a rotatable coupling plate at the other end, a stock attached to said rotatable coupling plate and containing a trigger, a low pressure piston in said low pressure cylinder, a piston rod, a pin and a bayonet slot connection for detachably locking said rod to said low pressure piston, a spring retaining sleeve slidably disposed on said rod, a coil spring disposed on said rod between said spring retaining sleeve and said coupling plate, a high pressure piston attached to the end of said rod, a high pressure cylinder mounted near the nozzle end of said low pressure cylinder and adapted to receive said high pressure piston, a piston rod spring disposed about said piston rod as it passes through said stock, a trigger spring, said piston rod spring and said trigger spring coacting with said trigger and said piston rod to impart a reciprocating motion to said high pressure piston, and a latch attached to said coupling plate and cooperating with said spring retaining sleeve for locking said spring retaining sleeve in retracted spring compressing position whereby said low pressure piston can be moved independently thereof.

FRANZ KARL SCHNEIDER.
     FRED HENRY EHNTS.